(12) United States Patent
Mori et al.

(10) Patent No.: US 6,929,880 B1
(45) Date of Patent: Aug. 16, 2005

(54) SQUARE CELL CONTAINER AND METHOD OF MANUFACTURING THE CELL CONTAINER

(75) Inventors: Katsuhiko Mori, Katano (JP); Susumu Kitaoka, Hirakata (JP); Shoji Yamashita, Hirakata (JP); Shigekazu Tanaka, Higashiosaka (JP)

(73) Assignees: Matsushita Electric Industrial Co., Ltd., Osaka (JP); Ikkoseiko Co., Ltd., Osaka (JP)

(*) Notice: Subject to any disclaimer, the term of this patent is extended or adjusted under 35 U.S.C. 154(b) by 0 days.

(21) Appl. No.: 10/009,164

(22) PCT Filed: May 1, 2000

(86) PCT No.: PCT/JP00/02897

§ 371 (c)(1),
(2), (4) Date: Jan. 28, 2002

(87) PCT Pub. No.: WO00/69004

PCT Pub. Date: Nov. 16, 2000

(30) Foreign Application Priority Data

May 7, 1999 (JP) .................................. 11-126873

(51) Int. Cl.[7] .......................... H01M 2/02; H01M 10/04
(52) U.S. Cl. ...................... 429/164; 29/730; 29/623.1; 429/176
(58) Field of Search ................... 429/176, 163, 429/164; 29/623.1, 730

(56) References Cited

U.S. PATENT DOCUMENTS 5,787,752 A * 8/1998 Iwase et al. .................. 72/349
6,127,064 A * 10/2000 Shibata et al. ............... 429/163
6,174,620 B1 * 1/2001 Okada et al. ................. 429/176
6,258,480 B1 * 7/2001 Moriwaki et al. ........... 429/176
6,333,124 B1 * 12/2001 Moriwaki et al. ........... 429/176
2003/0003355 A1 * 1/2003 Ueda et al. .................. 429/176

FOREIGN PATENT DOCUMENTS

| EP | 669663 | 8/1995 |
|----|--------|--------|
| JP | 6-52842 | 2/1994 |
| JP | 6-333541 | 12/1994 |
| JP | 7-99686 | 10/1995 |
| JP | 8-250095 | 9/1996 |
| JP | 10-284016 | 10/1998 |
| JP | 11-54095 | 2/1999 |

* cited by examiner

Primary Examiner—Mark Ruthkosky
(74) Attorney, Agent, or Firm—Jordan and Hamburg LLP (57) ABSTRACT

A prismatic battery case (3) has a configuration wherein a rectangular shorter-side plate (3a) has a thickness (A) larger than a thickness (B) of a longer-side plate (3b). When the prismatic battery case (3) is manufactured, a battery case material (8) punched into a predetermined shape undergoes deep drawing to form a first intermediate cup element (1) having a substantially elliptic cross section; the first intermediate cup element (1) undergoes redrawing successively in a plural stages to form a second intermediate cup element (2) having a substantially elliptic cross section which is smaller in minor-axis-diameter to major-axis-diameter ratio; and the second intermediate cup element (2) undergoes DI processing to form the prismatic battery case (3) having a substantially rectangular cross section wherein the thickness (A) of the shorter-side plate (3a) is made larger than the thickness (B) of the longer-side plate (3b).

3 Claims, 7 Drawing Sheets

SQUARE CELL CONTAINER AND METHOD OF MANUFACTURING THE CELL CONTAINER

TECHNICAL FIELD

The present invention relates to a prismatic battery case for use in various prismatic batteries such as a lithium-ion rechargeable battery, and to a method for manufacturing the prismatic battery case by DI (Drawing and Ironing) processing method (i.e. by successively performing both of drawing and ironing processing at a time).

BACKGROUND ART

In recent years, electronics technology advances have allowed higher performance, miniaturization, and reduction in weight and power consumption in electronic equipment. Consequently, various household portable appliances have been developed and put into practical use and their marketplace has been rapidly expanded. Representative examples thereof include a cam-corder, a notebook-type personal computer, and a portable telephone. This trend has created an increasing demand for further miniaturization and weight reduction as well as longer time duration in such appliances. To comply with such requirements, a lithium rechargeable battery offering a longer working life and a higher energy density, typified by a lithium-ion rechargeable battery, has been developed vigorously and put into wider use as a built-in driving power source for the appliances.

A lithium-ion rechargeable battery has the advantage over other commercially available batteries in that it offers not only sufficiently high energy density per unit volume (used as an index of miniaturization of a battery) but also significantly high energy density per unit weight (used as an index of weight reduction of a battery). The energy density of a battery depends mainly on battery active material of positive and negative electrodes constituting its element for electromotive force. However, miniaturization and weight reduction of a battery case for housing the element for electromotive force also plays an important role in determining the energy density. That is, a battery case which has a thinner wall than same-outside-shape battery cases is capable of accommodating a larger amount of battery active material. This helps increase the volume energy density of then battery. Moreover, by forming a battery case from a lightweight material, it is possible to reduce the weight of the entire battery and thus to increase its weight energy density.

As a natural consequence of the above-described trend in battery development, a prismatic battery which employs a thin-walled prismatic battery case is highly rated in terms of suitability for use in slim appliances and high space efficiency. Conventionally, as a method for manufacturing a prismatic battery case, so-called transfer drawing has been customarily adopted. In this processing method, by repeating deep drawing and stamping over 10 to 13 times using a transfer press machine, a battery case having a substantially rectangular cross section is fabricated.

However, in a prismatic battery case manufacturing method based on the transfer drawing, deep drawing and stamping need to be repeated over a dozen or so times. This leads to poor productivity (for example, 20 pieces of articles per minute). Moreover, according to the transfer drawing, reduction in a wall thickness of a battery case material, which is necessary to obtain higher volume energy density and thus higher capacity, is achieved by repeating deep drawing. Thus, a prismatic battery case realized by the transfer drawing suffers from lower strength and thus fails to provide a desired pressure withstanding strength when operated as a battery system. In particular, a prismatic battery case unlike a cylindrical battery case which is stable in shape under increased internal pressure of a battery, becomes distended like a barrel to approach a configuratively stable cylindrical shape. This might cause leakage of electrolyte and damage to the appliance.

Meanwhile, as a method for manufacturing a battery case for use in a cylindrical battery, DI method is used (see Japanese Examined Patent Publication No. Hei. 7-99686). With this method, a battery case is fabricated that, despite being made thin to enhance the volume energy density, provides desired pressure withstanding strength with higher productivity. In this DI method, a cup-like intermediate component fabricated by deep drawing using a press machine is subjected to drawing and stamping successively at a time. As compared with the transfer drawing method, the DI method has the following advantages: higher productivity is attained by reducing the number of process steps; the weight of a battery case is reduced by reducing the wall thickness of its side wall; battery energy density improves with an increase in battery capacity; and stress corrosion is suppressed. Thus, the DI method is coming into wider and wider use in manufacturing a battery case used for a cylindrical battery.

Hence, it can be considered that the above-described DI method is applied to the manufacture of a prismatic battery case. In this case, however, the following problem arises. In a case where a cylindrical battery case is fabricated by the DI method, during the DI processing, a cup-like intermediate component having a circular cross section is simply processed into a similar-shape battery case, i.e. into a battery case having a circular cross section. Accordingly, in an ironing step of the DI processing, the thickness of the entire side wall is evenly reduced. This allows the material to flow evenly during the processing, thereby achieving smooth deformation. By contrast, where a prismatic battery case is fabricated by the DI method, during the DI processing, a cup-like intermediate component having a circular cross section needs to be processed into a different-shape battery case, i.e. into a battery case having a substantially rectangular cross section. Accordingly, the material flows unevenly during the processing and is thus processed unstably, with the result that cracking, rupture, or distortion tends to occur particularly in the shorter-side plate of the battery case which is smaller in area.

For this reason, it has conventionally been impossible to fabricate a prismatic battery case by the DI method. Resultantly, a prismatic battery case is generally fabricated by the above-described transfer drawing method or impact molding using an aluminum material. In either case, however, the productivity is extremely unfavorable, and what is worse, it is impossible to form a battery case having a strength high enough to prevent deformation due to increased battery internal pressure without sacrificing its slimness and lightness. This makes it impossible to attain satisfactory volume energy density and weight energy density.

As another method for manufacturing a prismatic battery case, Japanese Laid-open Patent Publication No. Hei 6-333541 proposes a technique whereby a rectangular barrel and a bottom plate are separately formed and then the bottom plate is air-tightly bonded to the bottom portion of the rectangular barrel by laser welding. In this method, however, the number of process steps is almost the same as that in the transfer drawing method. Moreover, the method requires time-consuming operations including accurate positioning of the rectangular barrel and the bottom plate and laser welding process. This makes it impossible to attain improved productivity. Further, a prismatic battery case realized by the method fails to satisfy two mutually contradictory requirements, namely, offering higher energy density attained as a result of reduction in thickness and weight and offering pressure withstanding strength high enough to prevent deformation due to increased battery internal pressure.

The present invention has been made in the light of the above-described problems with conventional art, and accordingly its object is to provide a prismatic battery case which offers higher energy density as well as desired pressure withstanding strength, and a method for manufacturing the prismatic battery case by DI method.

DISCLOSURE OF THE INVENTION

To achieve the above object, the present invention provides a prismatic battery case with a substantially rectangular cross section which accommodates a element for electromotive force so as to constitute a prismatic battery, characterized in that, in the cross section, a thickness of a plate on the shorter side is made larger than a thickness of a plate on the longer side.

A prismatic battery employing such a prismatic battery case has the following advantage. In the battery case with a substantially rectangular cross section, its shorter-side plate has a relatively large thickness. Thus, even when the battery is activated and the internal pressure is increased, the shorter-side plate, just like a supports prevents the battery from becoming distended like a barrel to approach a configuratively stable cylindrical shape. In the prismatic battery case, occurrence of leakage of electrolyte and damage and malfunction in the appliance is therefore prevented, and thus its use realizes a highly reliable prismatic battery. Moreover, a longer-side plate, which is larger in area than the shorter-side plate, is made relatively thin and the content volume of the prismatic battery case is accordingly increased. This allows the battery case to contain a larger amount of battery active material, so that the volume energy density is increased. Further, in the battery case cracking and rupture encountered by the shorter-side plate during DI processing is avoided by making the thickness of the shorter-side plate relatively large. This means that a prismatic battery case is easily manufactured by the DI method having various advantages.

In the above-described prismatic battery case, if it is assumed that the thickness of the shorter-side plate is A, that the thickness of the longer-side plate is B, and that the thickness of the bottom plate is C, the relationship between them should preferably be given as: $B=\alpha A$ ($0.6<\alpha<1.0$), and $A=\beta C$ ($0.2<\beta<0.8$). By setting the thickness of each portion of the battery case to fall within the above-mentioned range, the battery case surely provides the above-described advantages.

Moreover, the prismatic battery case should preferably be formed from carbon steel for use in cold rolling that is composed principally of iron but contains carbon in the amount of 0.1 wt % or less. More preferably, the carbon steel in use should contain at least one of titanium and niobium in the amount of 0.1 wt % or less.

In regard to the relationship between carbon content and ironing workability in a metal material composed principally of iron, the smaller the carbon content, the greater the workability. Moreover, the workability is further enhanced by using a carbon steel containing at least one of titanium and niobium in the amount of 0.1 wt % or less. Thus, such a material lends itself to smooth formation of the prismatic battery case embodying the present invention.

Moreover, the prismatic battery case should preferably be processed such that an HV value, which represents Vickers hardness for a metal material composed principally of iron, of the processed side plate is 1.5 times or more larger than that of an unprocessed material.

Conventionally, a nickel-plated steel plate having a relatively high hardness (Vickers hardness: 100 to 120 HV) has been used as a battery case material to secure sufficient pressure withstanding strength in a battery case and to secure a sufficient strength in its sealed portion. However, by performing ironing on a cup-like intermediate component at an ironing rate set to be larger than a predetermined value, the battery case material, which has a low hardness in an unprocessed state, is formed into a prismatic battery case in which the hardness of the side plate is increased by the effect of work hardening. Thus, a readily formable material having a lower hardness of about 80 to 90 HV can be employed to form a cup-like intermediate component, thereby preventing cracking or rupture. Further, through the ironing, the longer-side plate, in particular, is allowed to have higher hardness by the effect of work hardening despite being made thin. Thus, it is possible to realize a prismatic battery case offering higher capacity and satisfactory pressure withstanding strength.

Still further, the prismatic battery case may preferably be shaped such that, in the side plate, part around a portion to be sealed when the battery is constructed is made 10% or more larger in thickness than the other part thereof.

Accordingly, the part around the battery sealing portion which is weakest in terms of pressure withstanding strength, is made 10% or more larger in thickness than the other part. Thus, a prismatic battery employing such a prismatic battery case in question maintains adequate closure strength under increased internal pressure.

A prismatic battery case manufacturing method according to the present invention includes a first process step for forming a first intermediate cup element having a substantially elliptic cross section by subjecting a battery case material punched into a predetermined shape to deep drawing; and a second process step for forming, by subjecting the first intermediate cup element to DI processing, i.e. to drawing and ironing successively at a time, a prismatic battery case with a substantially rectangular cross section in which a shorter-side plate is made larger in thickness than a longer-side plate.

This prismatic battery case manufacturing method, unlike the conventional transfer drawing method requiring a dozen or so process steps, requires only two process steps to realize a prismatic battery case having a desired shape. This significantly improves the productivity. Moreover, since the shorter-side late portion is made larger in thickness than the longer-side plate, cracking or rupture in the shorter-side plate is prevented during DI processing. Thereby a prismatic battery case having a desired shape is manufactured with stability..

Another prismatic battery case manufacturing method according to the present invention includes a first process step for forming a first intermediate cup element having a substantially elliptic cross section by subjecting a battery case material stamped into a predetermined shape to deep drawing; a second process step for forming a second intermediate cup element having a substantially elliptic cross section which is smaller in minor-axis-diameter to major-axis-diameter ratio than the cross section of the first intermediate cup element by subjecting the first intermediate cup element to redrawing successively in a plural stages; and a third process for forming, by subjecting the second intermediate cup element to DI processing, i.e. to drawing and ironing successively at a time, a prismatic battery case with a substantially rectangular cross section, wherein a shorter-side plate is larger in thickness than a longer-side plate.

In this prismatic battery case manufacturing method, the same effects as in the previously described manufacturing method are achieved. In addition, prior to DI processing, there is formed the second intermediate cup element having a substantially elliptic cross section which is smaller in minor-axis-diameter to major-axis-diameter ratio than the cross section of the first intermediate cup element. That is the role of the DI processing is simply to process a cup element having a substantially elliptic but nearly rectangular cross section into a similar-shape battery case having a substantially rectangular cross section, whereby defects such as distortion, cracking, or rupture are prevented, and a prismatic battery case with a desired shape is fabricated with stability.

In the prismatic battery case manufacturing method, at least in the first redrawing at the second process step, it is preferable that, with use of a drawing die having a substantially elliptic drawing hole whose major-axis-diameter is 5 to 20% longer than that of the first intermediate cup element., the first intermediate cup element be given a substantially elliptic cross section which is smaller in minor-axis-diameter to major-axis-diameter ratio than the cross section of the first intermediate cup element by performing drawing in such a way that only the dimension of the cup element in the minor-axis-diameter direction is reduced without restricting the dimension in the major-axis-diameter direction.

In this way, at least in the first redrawing at the second process step, the first intermediate cup element having a substantially elliptic cross section is at first processed into a configuration in which only the minor-axis direction dimension is reduced without restricting the major-axis direction dimension. Thus, an excess material created as a result of the processing flows toward the major-axis direction. Consequently, the first intermediate cup element is drawn into a cup element with a substantially elliptic cross section having a smaller minor-axis-diameter to major-axis-diameter ratio. That is, because of the smooth flow of the material, the first intermediate cup element is smoothly shaped into a cup element having a desired shape without distortion.

At the first process step of the above-described prismatic battery case manufacturing method, it is preferable that the battery case material be punched into a substantially oval shape.

Conventionally, a first intermediate cup element having a nearly circular, substantially elliptic cross section is formed by punching it out of a battery case material into disc-like shape. In this case, however, a finished prismatic battery case obtained through the final step has a large lug protruding upwardly from its shorter-side plate. To cut this lug, an additional operation is required. By contrast, if the cup element is formed by punching it out of a battery case material into an oval shape so that the finished prismatic battery case no longer has a lug, protruding upwardly from the shorter-side plate, to be cut off after completion of the prismatic battery, the punched holes remaining in the battery case material are arranged as tightly as possible compared to conventional cases. This helps reduce material losses.

The prismatic battery embodying the present invention is constituted by accommodating an element for electromotive force in a prismatic battery case manufactured by any of the above described manufacturing methods of the invention and then fluid-tightly sealing the opening portion with a sealing member.

The prismatic battery thus obtained has adequate pressure withstanding strength despite offering higher volume energy density.

BEST MODE FOR CARRYING OUT THE INVENTION

Figure 1A:
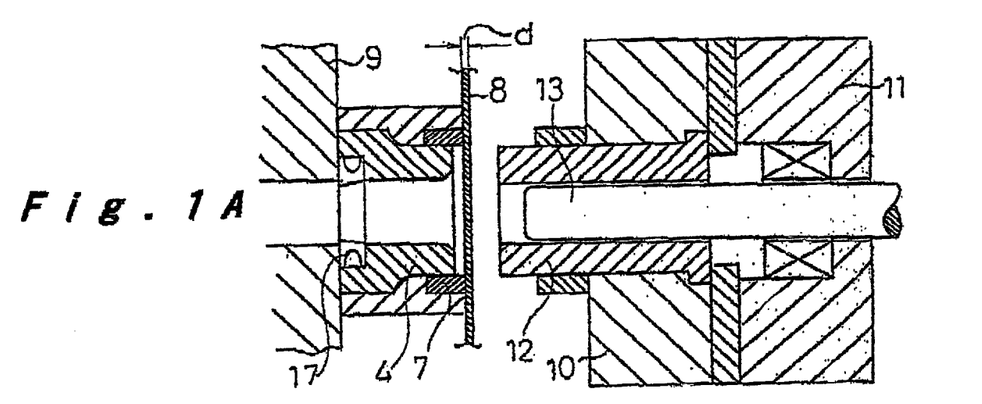
FIGS. 1A to 1C are sectional views of one embodiment of the prismatic battery case manufacturing method of the present invention, illustrating a first process step in a sequential order.
Figure 1B:
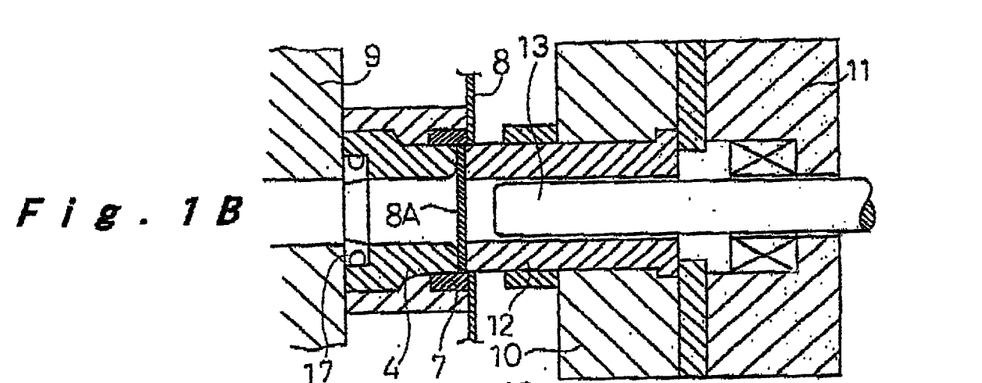
Figure 1C:
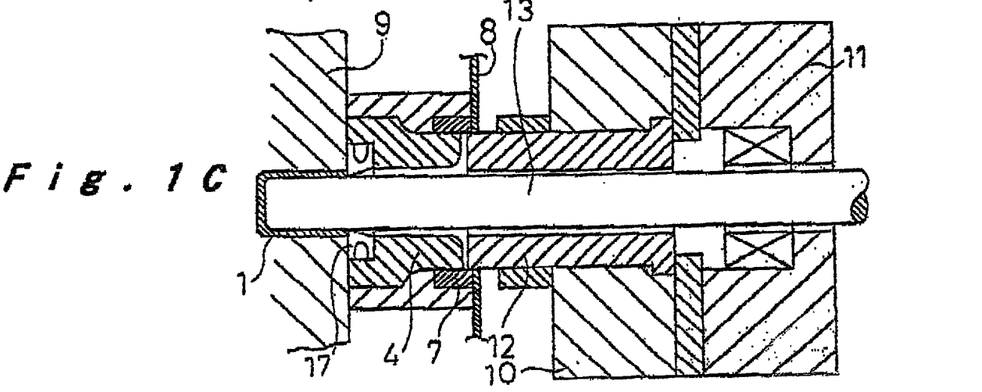
Figure 4:
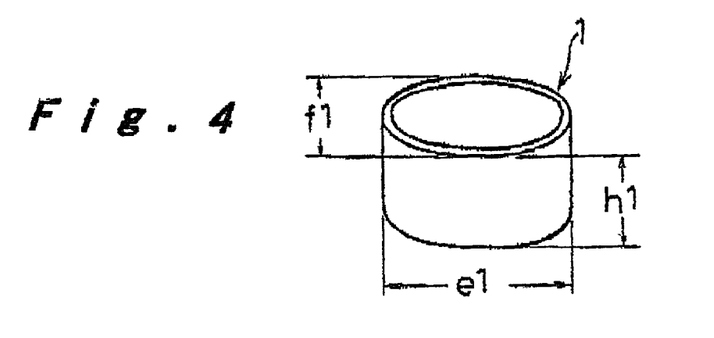
FIG. 4 is a perspective view illustrating a first intermediate cup element fabricated through the first process step.
Figure 7:
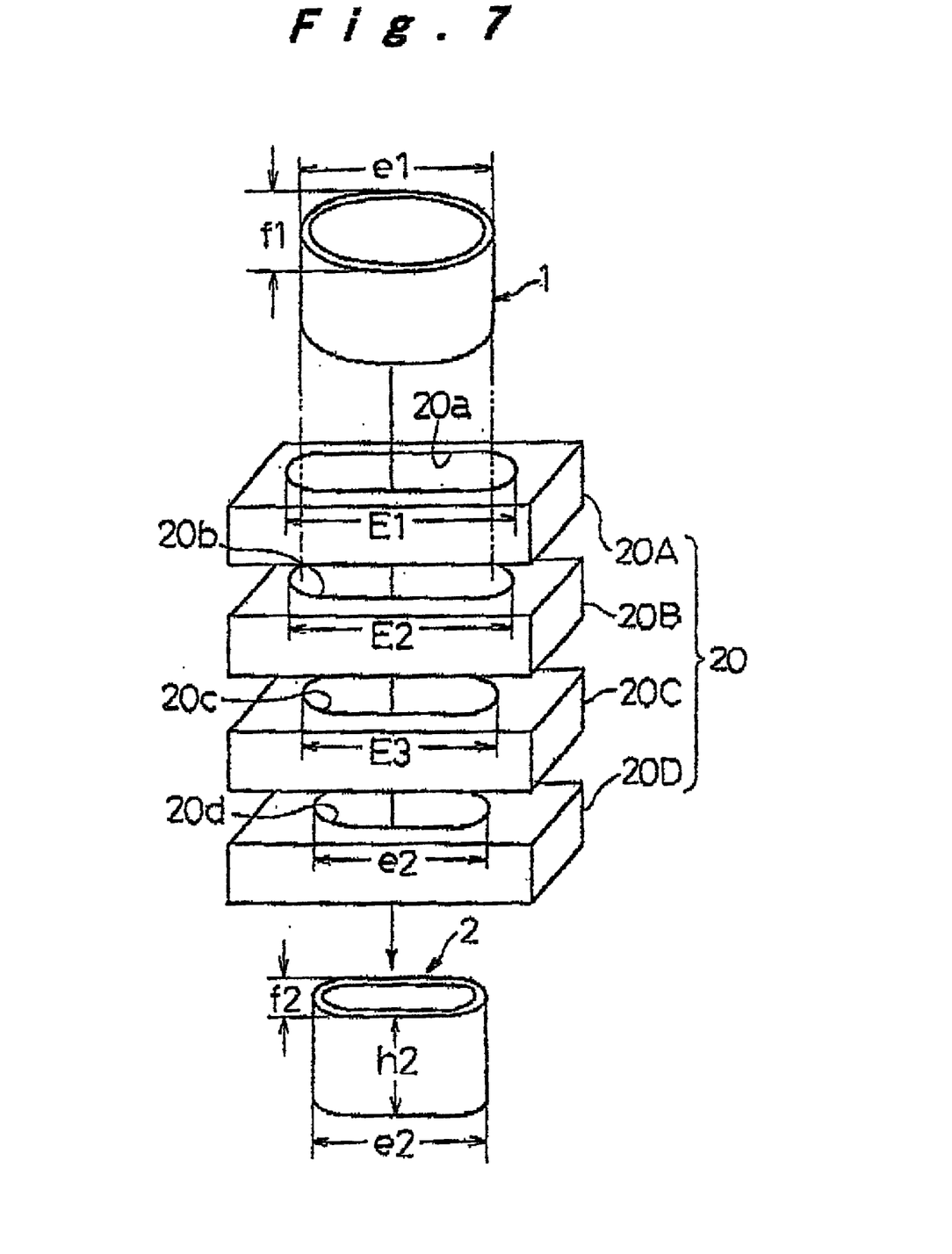
FIG. 7 is a perspective view illustrating the relationship among a die of a drawing press machine employed at the second process step, the first intermediate cup element, and a second intermediate cup element fabricated through the second process step.
Figure 8:
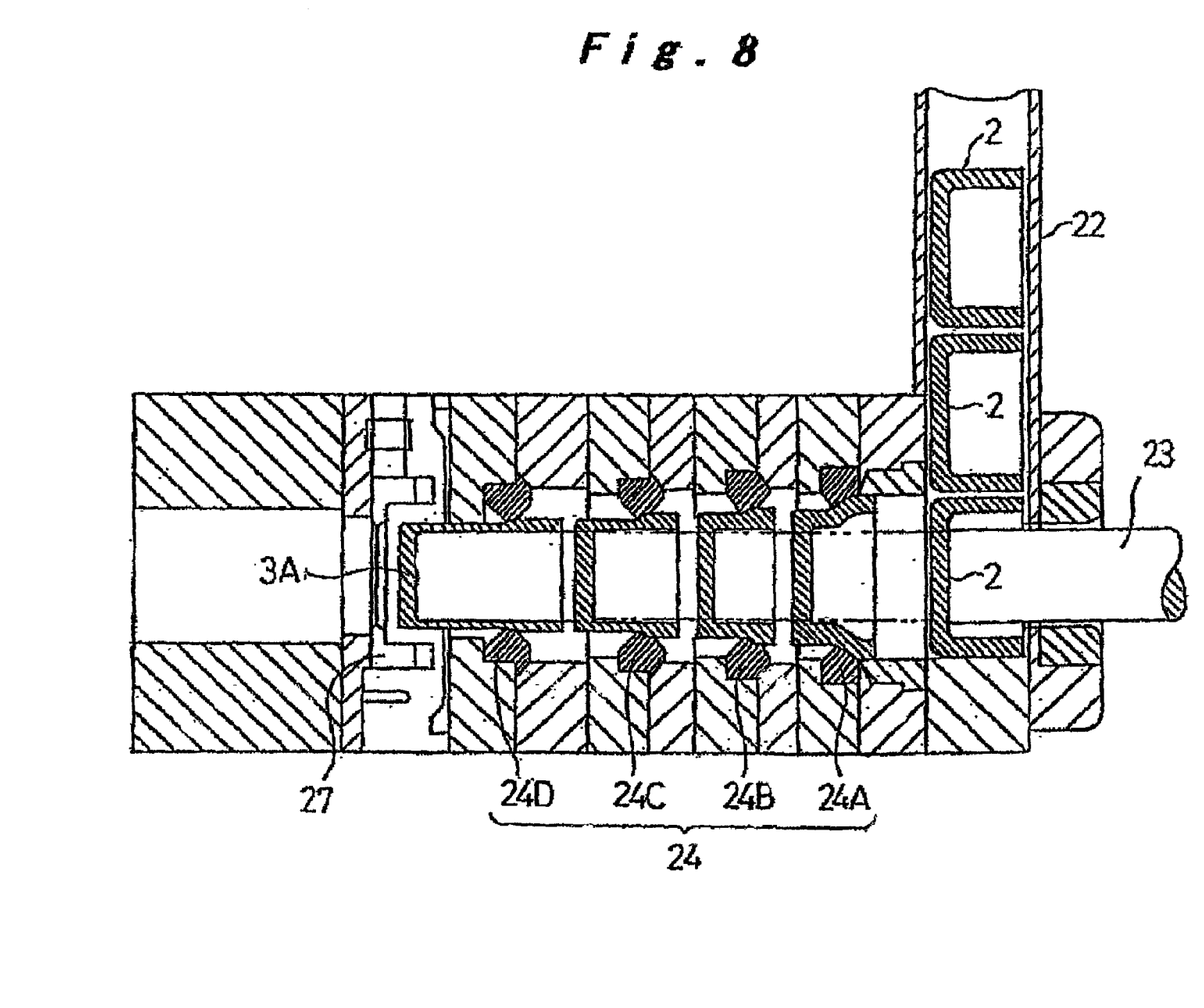
FIG. 8 is a horizontal sectional view of a third process step of the embodiment.

Hereinafter, preferred embodiments of the present invention will be described with reference to the accompanying drawings. In a prismatic battery case manufacturing method according to one embodiment, at a first process step shown in FIG. 1 representing a schematic horizontal sectional view, a battery case material 8 is subjected to punching and deep drawing so as to a first intermediate cup element 1 having a nearly circular, substantially elliptic cross section as shown in FIG. 4. At a second process step shown in FIGS. 5 and 6, the first intermediate cup element 1 is subjected to four steps of redrawing processing successively so as to form a second intermediate cup element 2 with a substantially elliptic cross section having a smaller minor-axis-diameter to major-axis-diameter ratio as shown in FIG. 7. Subsequently, at a third process step shown in FIG. 8 representing a schematic horizontal sectional view, the second intermediate cup element 2 is subjected to DI processing so as to form a desired prismatic battery case 3 shown in FIG. 9. Hereafter, the first through third process steps will be described in detail in this order.

FIGS. 1A to 1C show a press machine for performing punching and deep drawing at the first process step. Protrudingly at an open end of a cupping die 4 fixed to a die holder 9 is outer-fitted a blanking die 7. As shown in FIG.

Figure 3:
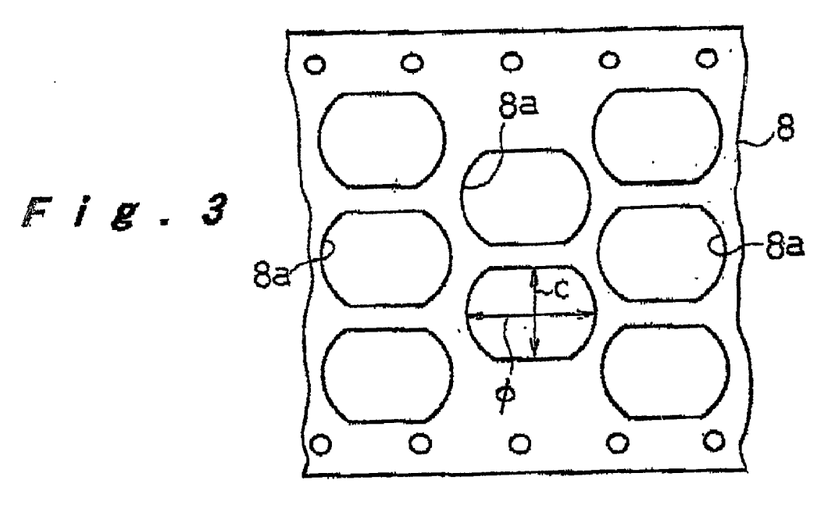
FIG. 3 is a plan view illustrating a battery case material having undergone a punching operation at the first process step.

1A, on an end face of the blanking die 7 is placed the battery case material 8. In this embodiment, a nickel-plated steel plate is used as the battery case material 8 to ensure adequate pressure withstanding strength in a prismatic battery case 3 and adequate strength in a sealed portion. As shown in FIG. 3, the battery case material 8 made of a nickel-plated steel plate is placed on the end face of the blanking die 7 as a hoop material and is positioned in succession.

Upon completion of the positioning of the battery case material 8, as shown in FIG. 1B, a blanking punch 12 and a cupping punch (drawing punch) 13, retained in a first and a second punch holder 10 and 11, respectively, are each moved closer to dies 4 and 7, respectively, and thereby the battery case material 8 is punched by the blade of each of the blanking die 7 and the blanking punch 12. Then, a blank 8A punched from the battery case material 8 is sandwiched between the blanking punch 12 and the cupping die 4 to be retained therebetween.

Figure 2:
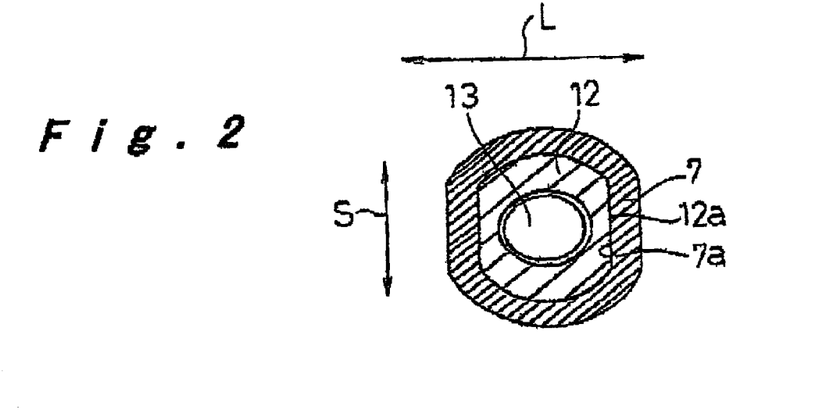
FIG. 2 is a left-hand sectional side view illustrating engagement between a blanking die and a blanking punch in a press machine employed at the first process step.

FIG. 2 is a left-hand sectional side view illustrating the engagement between the blanking die 7 and the blanking punch 12. The blades 7a and 12a of the blanking die 7 and the blanking punch 12 are each of substantially oval shape. The straight side portions obtained by cutting the roundness are equivalent to both sides of the prismatic battery case 3 as viewed in a major-axis-diameter direction L, i.e. the shorter-side plate 3a. The reason that the battery case material 8 is punched into an oval shape is as follows.

That is, if the battery case material 8 is punched into a disc-like shape, the prismatic battery case 3 obtained through the third process step has a large lug protruding upwardly from its shorter-side plate 3a. This lug needs to be removed afterwards by cutting. Hence, in this embodiment, the prismatic battery case 3 blank is obtained by punching it out of the battery case material 8 into a shape which keeps the prismatic battery case 3 from a lug protruding upwardly from its shorter-side plate. FIG. 3 shows the hoop-like battery case material 8 in which punched holes 8a remain as a result of obtaining battery case blanks. As seen from the figure, the punched holes 8a are arranged as tightly as possible in the battery case material 8 compared to conventional cases, whereby spaces among the punched holes 8a are reduced. In addition, as described above, no lug exists that needs to be cut off after completion of molding the prismatic battery case 3. Consequently, material losses are reduced.

Then, as shown in FIG. 1C, the blank 8A punched from the material 8 and sandwiched between the blanking punch 12 and the cupping die 4 is pressed by the cupping punch 13 and is thereby drawn into the inside of the cupping die 4. Thereafter, as shown in FIG. 2, the blank 8A is drawn by the cupping punch 13 to have an outer shape having a nearly circular, substantially elliptic cross section, so that the first intermediate cup element 1 shown in FIG. 4 is molded.

During the deep drawing at the first process step, the blanking punch 12 loads the blank 8A punched from the material 8 a specific force (which is not so strong as to roll the blank 8A) that tends to press it against the upper end face of the cupping die 4. That is, the blanking punch 12 imparts tension to the blank 8A so as to keep it from becoming wrinkled. Although the press machine has no wrinkle preventive mechanism necessary for deep drawing, the machine is capable of performing deep drawing by the blanking punch 12 functioning to prevent wrinkles. The first intermediate cup element 1 molded in the above-described manner is retained by a stopper 17 having a spring, and then only the cupping punch 13 and the blanking punch 12 return to their original positions shown in FIG. 1A. Subsequently, the above-described operations will be repeated.

The first intermediate cup element 1 having a nearly circular, substantially elliptic cross section is fabricated through the first process step by deep drawing using the cupping punch 13 and the cupping die 4 opposed to each other with a clearance therebetween that is equivalent to the thickness of the battery case material 8. Thus, there is little difference between a thickness of the first intermediate cup element 1 as a whole and a thickness d of the battery case material 8.

Figure 5:
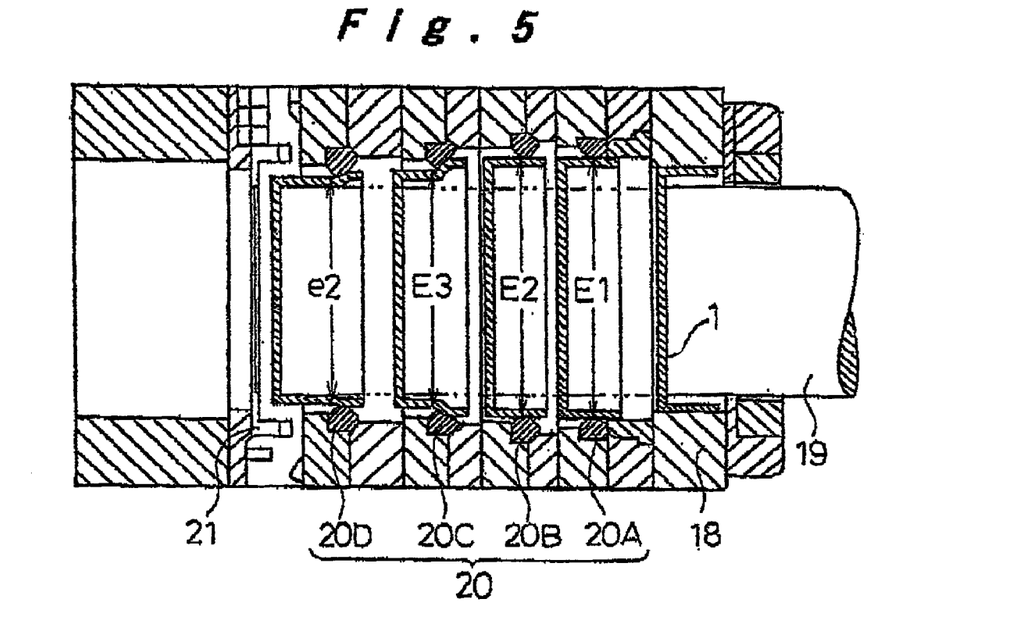
FIG. 5 is a vertical sectional view of a second process step of the embodiment.
Figure 6:
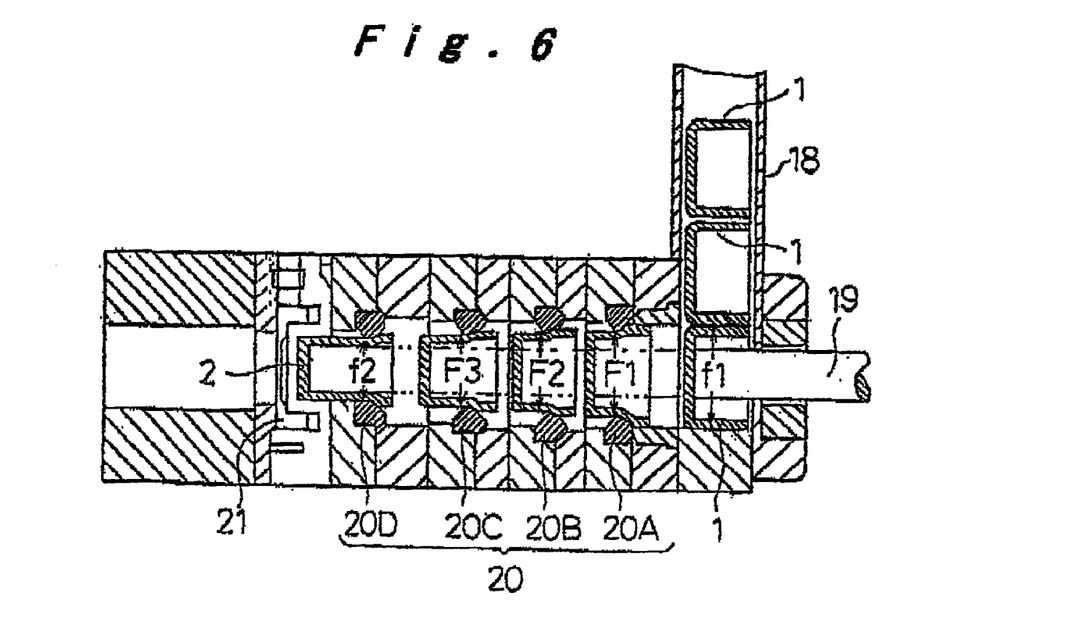
FIG. 6 is a horizontal sectional view of the second process step.

Next, the first intermediate cup element 1 is subjected to four steps of redrawing at the second process step using the drawing press machine shown in FIGS. 5 and 6 so as to be formed into the second intermediate cup element 2. The drawing press machine for fabricating the second intermediate cup element 2 by performing four steps of drawing at a time is composed of an intermediate component carrier 18, a cupping punch 19, a die mechanism 20, and a stripper 21. FIG. 7 is a perspective view of the die mechanism 20.

The intermediate component carrier 18 carries the first intermediate cup element 1 fabricated through the first process step to molding positions in succession. The die mechanism 20 includes first through fourth drawing dies 20A to 20D that are arranged in line so as to be coaxial with the cupping punch 19. The first intermediate cup element 1 is carried to the molding position to be positioned therein, is then pressed by the cupping punch 19 driven by a fly wheel (not shown), and is thereby drawn into a shape which conforms to the inside shape of each of the first and second drawing dies 20A and 20B.

Here, a drawing hole 20a of the first drawing die 20A is formed in a substantially elliptic shape and has its major-axis-diameter E1 made longer than a major-axis-diameter e1 of the first intermediate cup element 1, as shown in FIG. 7, and has its minor-axis diameter F1 made slightly shorter than a minor-axis diameter f1 of the intermediate cup element 1, as shown in FIG. 6. A drawing hole 20b of the second drawing die 20B is formed in a substantially elliptic shape and has its major-axis-diameter E2 made slightly shorter than the major-axis-diameter E1 of the first drawing die 20A but made slightly longer than the major-axis-diameter e1 of the first intermediate cup element 1, as shown in FIG. 7, and has its minor-axis diameter F2 made slightly shorter than the minor-axis diameter F1 of the first drawing die 20A, as shown in FIG. 6.

Thus, the first intermediate cup element 1 is pressed by the cupping punch 19 and thereby passes through the drawing holes 20a and 20b of the first and second drawing dies 20A and 20B successively, so that the minor-axis diameter f1 is gradually decreased and simultaneously an excess material created at a result of this drawing operation flows toward the major-axis direction. Consequently, the first intermediate cup element 1 is drawn into a cup element with a substantially elliptic cross section having a smaller minor-axis diameter to major-axis-diameter ratio. In this way, because of the smooth flow of the material, the first intermediate cup element 1 having a nearly circular, substantially elliptic cross section is smoothly shaped into a cup element having a desired substantially elliptic cross section without suffering from distortion.

As described hereinabove, the first intermediate cup element 1 is at first drawn so as to extend in the major-axis-diameter direction. This is because, if the first intermediate cup element 1 is subjected to drawing with both of its major- and minor-axis diameter direction dimensions initially restricted, the material is inhibited from flowing smoothly due to the difference in area between the major- and minor-axis diameter direction portions. This causes defects such as distortion, cracking, or rupture. Moreover, assume that the first intermediate cup element 1 is immediately subjected to DI processing and is thereby formed into a prismatic battery case. In this case, the role of the DI processing is to process a cup element having a nearly circular, substantially elliptic cross section into a different-shape battery case having a substantially rectangular cross section. This causes rupture and cracking. Note that the major-axis-diameters E1 and E2 of the drawing holes 20a and 20b provided in the first and second drawing dies 20A and 20B, respectively, should preferably be set to be 5 to 20%, more preferably 10% longer than the major-axis-diameter e1 of the first intermediate cup element 1. This allows smooth drawing for the cup element without distortion.

The cup element is fed to the second drawing die 20B and is thereby drawn so as to have a substantially elliptic cross section with its minor-axis diameter direction dimension initially restricted. Thereafter, the cup element is continuously pressed by the cupping punch 19 and thereby passes through a third and a fourth drawing die 20C and 20D in succession, so that the major-axis direction dimension of the substantially elliptical cross section is restricted. That is, a drawing hole 20c of the third drawing die 20C is formed in a substantially elliptic shape having its major-axis-diameter E3 made shorter than the major-axis-diameter e1 of the first intermediate cup element 1 and having its minor-axis diameter F3 made slightly shorter than the minor-axis diameter F2 of the drawing hole 20b of the second drawing die 20B. Further, a drawing hole 20d of the fourth drawing die 20D is formed in a substantially elliptic shape having its major-axis-diameter e2 and minor-axis diameter f2 made identical with a major-axis-diameter e2 and minor-axis diameter f2, respectively, of the to-be-obtained second intermediate cup element 2. That is, with respect to the cupping punch 19, the major-axis-diameter e2 and minor-axis diameter f2 of the drawing hole 20d provided in the fourth drawing die 20D are so determined that a clearance created therebetween has a width equivalent to the thickness d of the battery case material 8.

In this way, the second intermediate cup element 2 is obtained by performing drawing on the first intermediate cup element 1 such that it extends in the major-axis-diameter direction while the minor-axis diameter direction dimension is reduced and thereafter the major-diameter direction dimension is reduced to a predetermined level. Consequently, the finished second intermediate cup element 2 no longer suffers from distortion and thus has a desired substantially elliptic cross section. Moreover, at the second process step, the first intermediate cup element 1 is subjected only to redrawing and no ironing is performed thereon. This allows the second intermediate cup element 2 to have an entire wall thickness substantially identical with the thickness d of the battery case material 8. The second intermediate cup element 2 thus fabricated is removed from the drawing press machine by the stripper 21.

Lastly, at the third process step shown in FIG. 8, the second intermediate cup element 2 is subjected to DI processing, i.e. to one step of drawing and three steps of ironing successively at a time by a drawing/ironing machine, and is thereby formed into a prismatic battery case 3 having a desired shape. The drawing/ironing machine includes an intermediate component carrier 22, a DI punch 23, a die mechanism 24, and a stripper 27. The die mechanism 24 includes a drawing die 24A and a first through third ironing dies 24B to 24D that are arranged in line so as to be coaxial with the DI punch 23.

The intermediate component carrier 22 at first carries the second intermediate cup element 2 to molding positions in succession. The second intermediate cup element 2 carried to and positioned in the molding position is pressed by the DI punch 23 driven by a fly wheel (not shown), and is thereby drawn by the drawing die 24A into a shape which conforms to the outer shape of the DI punch 23. The cup element having passed through the drawing die 24A is then so formed as to be long-bodied and to have a cross section having its major-axis and minor-axis diameter dimensions kept slightly smaller relative to the second intermediate cup element 2. Consequently, the cross section is processed into a nearly rectangular, substantially elliptic shape which is sought after in the cross section of the prismatic battery case 3. At this time, almost no change is observed in the wall thickness of the cup element.

Subsequently, as the pushing action of the DI punch 23 continues, the cup element having passed through the drawing die 24A is fed to the first ironing die 24B so as to undergo the first step of ironing, whereby the side peripheral portion spreads and its thickness is reduced. Moreover, the hardness is increased by the effect of work hardening. Then, as the pushing action of the DI punch 23 further continues, the cup element having passed through the first ironing die 24B is fed to the second ironing die 24C having an ironing hole smaller than that of the first ironing die 24B and is then fed to the third ironing die 24D having an ironing hole smaller than that of the second ironing die 24C so as to undergo the second and third steps of ironing successively, whereby the peripheral wall portion spreads step by step and its thickness is further reduced. Moreover, the hardness is increased by the effect of work hardening. The cup element then passes through the third ironing die 24D. Hereupon, a battery case workpiece 3A is realized. In this case, DI processing is performed on the second intermediate cup element 2 with a substantially elliptic cross section having a smaller minor-axis-diameter to major-axis-diameter ratio, i.e. a nearly rectangular, substantially elliptic cross sections. This allows smooth DI processing, whereby a prismatic battery case having a desired shape is realized with stability.

Figure 9:
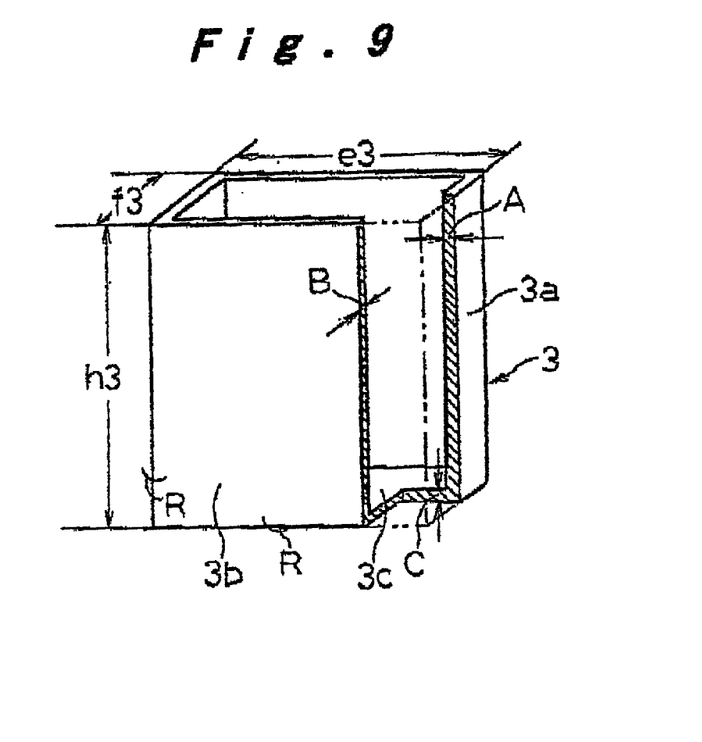
FIG. 9 is a partially cutaway perspective view of a prismatic battery case fabricated through the third process step.

After being removed from the drawing/ironing machine by the stripper 27, the battery case workpiece 3A has its side upper end (a lug), which suffers slight distortion due to various treatments, cut off and is eventually formed into a prismatic battery case 3 shown in FIG. 9.

As described hereinabove, the prismatic battery case 3 manufacturing method according to the embodiment, unlike the conventional transfer drawing method requiring a dozen or so process steps, requires only three process steps, namely, the first through third process steps, to realize a prismatic battery case 3 having a desired shape. This significantly improves the productivity. Moreover, at the first process step, a battery case blank is obtained by punching it out of the battery case material 8 into a substantially oval shape, whereby material losses are reduced. In addition, the following advantage is attained.

That is, the above-described prismatic battery case 3 is designed such that a thickness A of the shorter-side plate 3a is larger than a thickness B of the longer-side plate 3b. Such a prismatic battery case 3 is easily realized by taking the setting of the clearance between the DI punch 23 and the dies 24A to 24D into consideration, and its illustration is omitted here since the realized configuration is imaginable. That is, for the first and second steps of ironing, the ironing holes of the first and second ironing dies 24B and 24C are shaped such that the extent of ironing performed on the part serving as the longer-side plate 3b is greater than the extent of ironing performed on the part serving as the shorter-side plate 3a. Ultimately, the ratio of the thickness B of the longer-side plate 3b of the battery case 3 to the thickness A of the shorter-side plate 3a thereof is determined in accordance with the shape of the ironing hole of the third ironing die 24D.

Numerically, the ratio between the thickness A of the shorter-side plate 3a and the thickness B of the longer-side plate 3b should preferably be defined by the following formula (1):

$$B = \alpha A \quad (0.6 < \alpha < 1.0)$$

Moreover, the part serving as a bottom plate 3c is processed solely by the pushing action of the DI punch 23, and almost no ironing processing is performed thereon. This allows the bottom plate 3c to have a thickness C slightly smaller than the thickness d of the battery case material 8. Consequently, in the above-described prismatic battery case 3, the ratio between the thickness A of the shorter-side plate 3a and the thickness C of the bottom plate 3c should preferably be defined by the following formula (2):

$$A = \beta C \quad (0.2 < \beta < 0.8)$$

Here, the thickness of the entire prismatic battery case 3 can be made relatively large by replacing symbol $\alpha$ in the formula (1) with 1.0, i.e. by setting the thickness B of the longer-side plate 3b to be identical with the thickness A of the shorter-side plate 3a. In this case, even though the intermediate cup element 1 obtained through the first process step is immediately subjected to DI processing at the third process step, without performing the second process step, so as to be formed into an intended prismatic battery case 3, the finished prismatic battery case 3 has a desired shape.

In a prismatic battery employing the above-described prismatic battery case 3, the prismatic battery case 3 has shorter-side plates 3a on both major-axis-diameter sides, that have a relatively large thickness A and are supported integrally by the bottom plate 3c having a still larger thickness C. Thus, when the battery is activated and the internal pressure is increased, the shorter-side plate 3a, just like a support, prevents the longer-side plate 3b becoming distended like a barrel to approach a configuratively stable cylindrical shape. Therefore, the prismatic battery is surely protected against leakage of electrolyte and occurrence of damage and malfunction in the appliance, and thus offers excellent reliability.

Moreover, the longer-side plate 3b has a relatively small thickness B despite having a larger surface area, and the content volume of the prismatic battery case 3 is accordingly increased. This allows the prismatic battery case 3 to accommodate a larger amount of battery active material, thereby increasing the volume energy density. Further, the longer-side plate 3b has a thickness d which is substantially identical with the thickness of the battery case material 8 by the time the first and second process steps and the drawing at the third process step are completed. The longer-side plate 3b is then made thinner relative to the thickness d of the battery case material 8 solely by the ironing of the DI processing at the third process step. Accordingly, its hardness is significantly increased by the effect of work hardening obtained during the ironing, so that the longer-side plate 3b exhibits satisfactory strength despite being given a relatively small thickness B by the ironing. In other words, the longer-side plate 3b of the prismatic battery case 3 is made thinner while its hardness is increased by the effect of work hardening during the ironing. Thus, realized is a prismatic battery case 3 that has a thickness far smaller than that of a prismatic battery case fabricated by the transfer drawing method and nevertheless offers a strength approximately twice as high as that of the battery case material 8, i.e. the base material. A prismatic battery employing the prismatic battery case 3 offers not only higher energy density brought by an increase in the capacity but also a pressure withstanding strength high enough to prevent deformation due to an increase in the battery internal pressure.

Next, a description will be given below as to a specific example of implementation of the prismatic battery case 3 manufacturing method according to the above-described embodiment. Firstly, actually measured values for the first process step will be given. As the battery case material 8 shown in FIG. 1A, a nickel-plated steel plate having a thickness d of 0.4 was used. As shown in FIG. 3, this material 8 was punched into an oval shape having a diameter $\phi$ of 45 mm and a cut-portion dimension c of 41 mm. A blank 8A punched from the material 8 was subjected to deep drawing by the press machine shown in FIGS. 1A to 1C, and was thereby formed into the first intermediate cup element 1 shown in FIG. 4 that had a substantially elliptic cross section with a major-axis-diameter e1 of 27.4 mm and a minor-axis diameter f1 of 22.6 mm, and had a height h1 of 16.1 mm. The first intermediate cup element 1 had an entire wall thickness substantially identical with the thickness d of the battery case material 8. Since the blank to be formed into the first intermediate cup element 1 was obtained by punching it out of the battery case material 8 into an oval shape, no lug was formed protrudingly at the upper end of the minor-axis diameter direction portion thereof.

Secondly, actually measured values for the second process step will be given. The first intermediate cup element 1 was subjected to redrawing by the drawing press machine shown in FIGS. 5 and 6, and was thereby formed into the second intermediate cup element 2 shown in FIG. 7 that had a substantially elliptic cross section with a major-axis-diameter e2 of 26.1 mm and a minor-axis diameter f2 of 12.48 mm, and had a height h2 of 23.5 mm. At this time, the drawing hole 20a of the first drawing die 20A was given a substantially elliptic shape having a major-axis-diameter of 20.00 mm and a minor-axis diameter of 19.00 mm. The second intermediate cup element 2 obtained through the second process step was free from distortion, rupture, or cracking, was long-bodied unlike the first intermediate cup element 1, and was formed into a cup having a flat oval cross section analogous to the cross section of the to-be-obtained desired prismatic battery case 3.

In the end, through the third process step, the prismatic battery case 3 was realized that had the following configuration; the shorter-side plate 3a had an outer dimension f3 of 4.5 mm and a thickness A of 0.17 mm; the longer-side plate 3b had an outer dimension e3 of 22 mm and a thickness B of 0.15 mm; and the height h3 was set at 45 mm. A corner R between the shorter-side plate 3a and the longer-side plate 3b, and a corner R between the bottom plate 3c and the side plates 3a and 3b were each set at 0.1 mm in radius. As described above, the prismatic battery case 3 having a desired shape was realized without any trouble by DI method, which had conventionally been considered impracticable. Moreover, no defect, such as distortion, was observed in the finished prismatic battery case 3.

Next, a supplementary explanation will be given as to the above-described embodiment. As the battery case material 8, a nickel-plated steel plate is used that is composed mainly of iron and has a nickel layer formed at least on its surface to be disposed on the inner-surface side of the battery. Here, as a result of examinations conducted on metal materials composed mainly of iron, it was found that, to implement the manufacturing method according to the embodiment, it is preferable to use carbon steel for use in cold rolling that is iron-based and contains carbon (C) in the amount of 0.1 wt % or less, more preferably, carbon steel containing at least one of titanium (Ti) and niobium (Nb) in the amount of 0.1 wt % or less. In regard to the relationship between carbon content and ironing workability, it was confirmed that the smaller the carbon content, the more satisfactory workability is attained. Also confirmed was that the workability was further improved by using carbon steel containing at least one of titanium (Ti) and niobium (Nb) in the amount of 0.1 wt % or less. Note that a metal material used for the battery case material 8 is not limited to such a nickel-plated steel plate as described above. It is also possible to use instead stainless steel which is excellent in corrosion resistance and pressure tightness, aluminum, aluminum alloy, magnesium alloy, or the like. Among them, aluminum and aluminum alloy are particularly preferable, because they are lighter in weight and thus lend themselves to reduction of battery weight. Moreover, their excellent resistance to rust eliminates the need for plating. In a case of using aluminum alloy, ones numbered in the 3000 range in JIS standard are preferable.

Moreover, it was found that, at the third process steps it is preferable to perform ironing on the prismatic battery case 3 such that the HV value representing Vickers hardness of the side plates 3a and 3b is 1.5 times or above larger than the HV value of the metal material composed mainly of iron for use as the battery case material 8. In this way, in contrast to conventional constructions which employ, as a battery case material, a nickel-plated steel plate having a relatively high hardness (Vickers hardness: 100 to 120 HV) to secure adequate pressure withstanding strength in the battery case and to secure adequate strength in the sealed portion, in this embodiment, by performing ironing at an ironing rate set to be larger than a predetermined value, for example, the nickel-plated steel plate, although it has a low hardness (Vickers hardness: 80 to 90 HV) in the state of the battery case material 8, is formed into the prismatic battery case 3 in which the side plates 3a and 3b are allowed to have a hardness as high as 200 HV by the effect of work hardening.

A nickel-plated steel plate having a hardness as low as 80 to 90 HV, i.e. exhibiting excellent workability, is therefore subjected to deep drawing and redrawing at the first and second process steps, whereby cracking and rupture are prevented. Moreover, with the ironing at the third process step, the longer-side plate 3b has a higher hardness despite being made thin, so that the prismatic battery case 3 offers higher capacity and adequate pressure withstanding strength.

Figure 10:
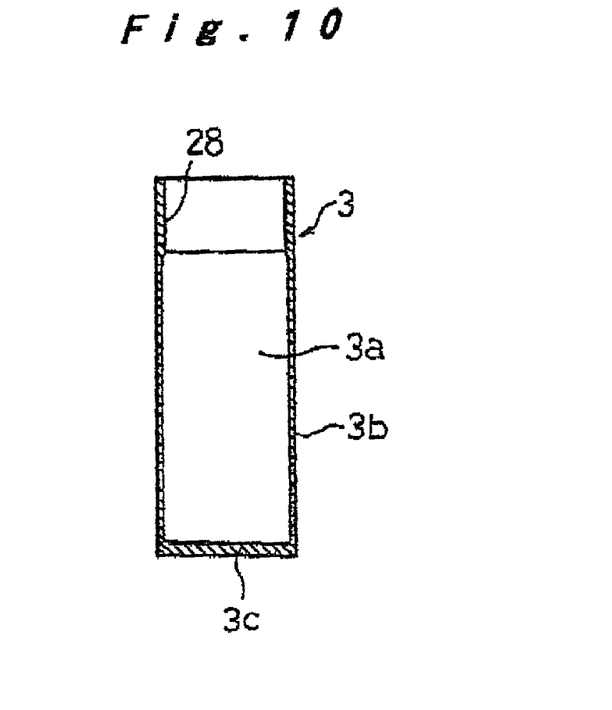
FIG. 10 is a vertical sectional view of another prismatic battery case fabricated through the third process step.

Further, it is more desirable to give the prismatic battery case 3 the configuration shown in FIG. 10 representing a vertical cross sectional view. The prismatic battery case 3 shown in FIG. 10 is constructed basically in the same manner as that of the above-described embodiment, i.e. the prismatic battery case 3 shown in FIG. 9, the only difference being that a thick-walled portion 28, which has a thickness about 10% larger than those of other portions, is formed around the opening portion provided for the shorter-side and longer-side plates 3a and 3b, that is, the portion to be sealed to finalize the prismatic battery. Thus, the components shown in FIG. 10 are identified with the same reference symbols as used in FIG. 9. The thick-walled portion 28 is formed by making hollow specific part of the DI punch 23 of the drawing/ironing machine at the third process step. In a prismatic battery employing the prismatic battery case 3, since the thickness of part around the sealed portions which puts up with the lowest pressure withstanding strength, is made 10% or more larger than those of other portions, even when the battery internal pressure is increased, satisfactory sealing strength is maintained.

Figure 11:
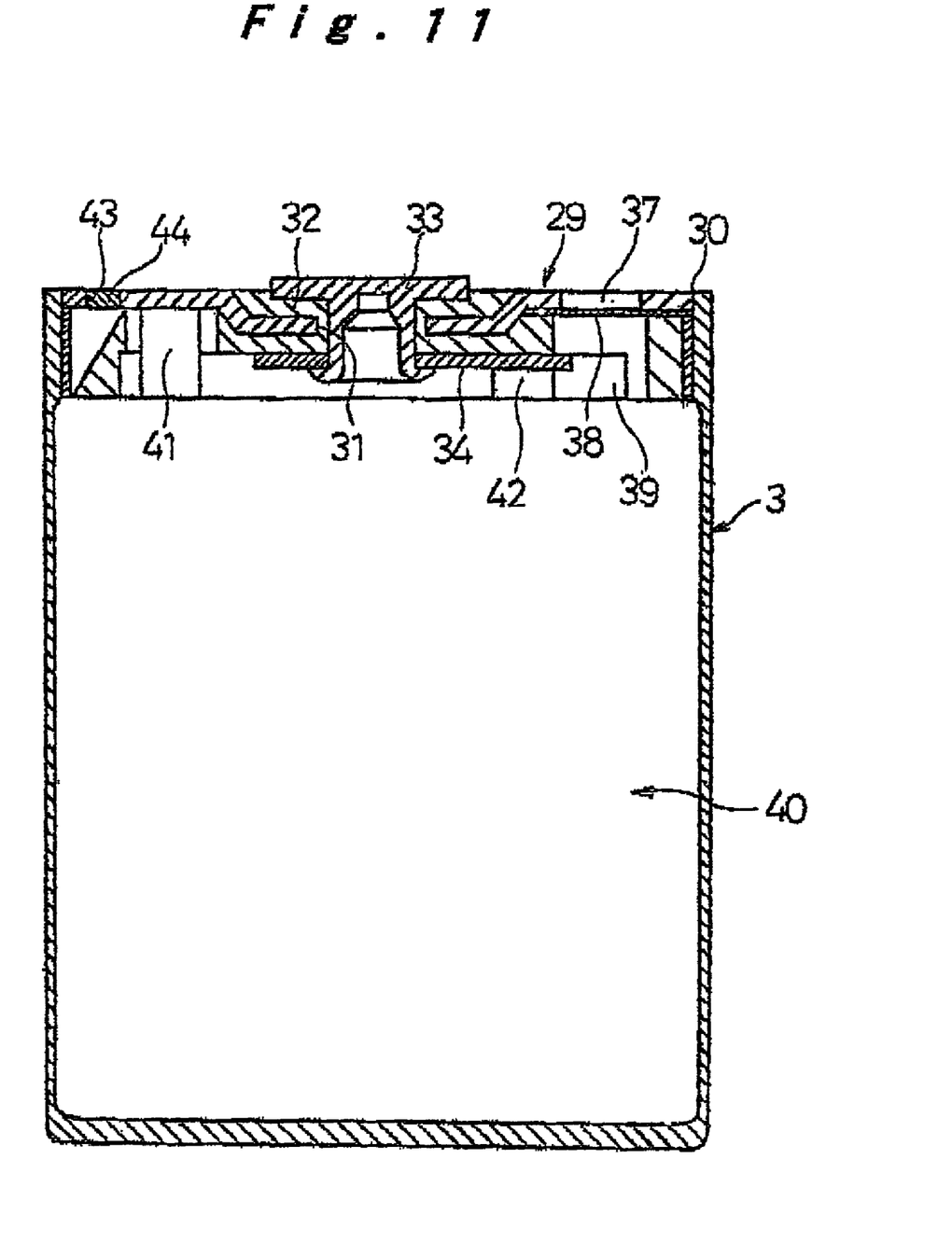
FIG. 11 is a vertical sectional view of a prismatic battery constituted by the prismatic battery case.

FIG. 11 is a vertical sectional view illustrating a rectangular lithium-ion rechargeable battery constituted by the above-described prismatic battery case 3. In this prismatic battery, the prismatic battery case 3 has a sealing plate 29 fitted to its opened upper edge, and the prismatic battery case 3 is integrally fixed to a fit portion 30 of the sealing plate 29 by laser welding, thereby fluid-tightly and air-tightly sealing the battery. The sealing plate 29 has its central portion curved concavely inwardly, and has a through hole 31 formed therein. Integrally attached to the through hole 31 is a gasket 32 made of an electrolyte-resistant and electrically insulative synthetic resin to which a sealing agent composed of a mixture of blown asphalt and mineral oil is applied.

Fixed to the gasket 32 is a rivet 33 serving also as a negative-electrode terminal which is made of nickel or nickel-plated steel plate. After inserted into the central portion of the gasket 32, the rivet 33 is fluid-tightly and air-tightly fixed to the gasket 32 at its tip by caulking with its lower part fitted to a washer 34. Note that the gasket 32 employed in the embodiment is integrally formed with the sealing plate 29 by injection molding. Between the rivet 33 serving also as a negative electrode terminal and the outer edge of the longer side of the sealing plate 29 is provided a substantially elliptic exhaust hole 37. The exhaust hole 37 is blocked by an aluminum foil 38 which is integrally formed with the inner surface of the sealing plate 29 by press-fitting, thereby constituting an explosion-proof safety valve.

The prismatic battery case 3 has an electrode group 40 accommodated in its housing portion for housing an element for electromotive force. The electrode group 40 is composed of a single positive electrode (not shown) and a negative electrode (not shown) wound into a roll with a separator made of a fine porous polyethylene film interposed therebetween, and its outermost periphery is wrapped in a separator 39. In this way, the cross section is given a flat oval shape. In the electrode group 40, a positive electrode lead plate 41 is connected to the inner surface of the sealing plate 29 by spot welding using laser beams, and a negative electrode lead plate 42 is connected to the washer 34 by resistance welding.

The sealing plate 29 has an inlet hole 43. After a predetermined amount of organic electrolyte is poured into, the inlet hole 43, the inlet hole 43 is covered with a lid 44 fitted thereto. Then, the lid 44 is laser-welded to the sealing plate 29, thereby finishing off a prismatic battery. Note that, here, although description is made only of the case where the electrode group 40 formed into a roll so as to have a flat oval cross section is used, the prismatic battery case 3 is applicable to a prismatic battery which has, like an ordinary rectangular cell, an electrode group composed of a plurality of positive and negative electrodes laminated on one another with a separator interposed therebetween.

In the prismatic battery case 3 fabricated by the above-described manufacturing method according to the embodiment, the longer-side plate 3*b* is made smaller in thickness than the shorter-side plate 3*a*. The prismatic battery constituted by the prismatic battery case 3 is capable of accommodating a larger number of electrode groups 40 and thus offering higher capacity. Further, since the thickness of the shorter-side plate 3*a* of the prismatic battery case 3 is made larger and the side plates 3*a* and 3*b* of the prismatic battery case 3 are given higher hardness by the effect of work hardening, even when the battery internal pressure is increased, the battery is prevented from becoming distended like a barrel. Leakage of electrolyte and breakage in the appliance is thus prevented, so that excellent reliability is attained.

INDUSTRIAL APPLICABILITY

As described heretofore, according to the present invention, in the prismatic battery case having a rectangular cross section, the shorter-side plate is made larger in thickness than the longer-side plate. In a prismatic battery constituted by this prismatic battery case, since the shorter-side plate provided on both sides of the prismatic battery case in a major-axis-diameter direction has a relatively large thickness, even when the battery is activated and the internal pressure is increased, the shorter-side plate, just like a support, prevents the longer-side plate becoming distended like a barrel to approach a configuratively stable cylindrical shape, consequently, the prismatic battery is surely protected against leakage of electrolyte and causes no damage and defects in the appliance, and thus offers excellent reliability.

Moreover, the longer-side plate having a larger surface area is made to have a relatively small thickness, and the content volume of the prismatic battery case is accordingly increased. This allows the prismatic battery case to contain a larger amount of battery active material, and this leads to an increase in the volume energy density. That is, the present invention is advantageous in providing a prismatic battery case offering not only higher energy density but also satisfactory pressure withstanding strength.

What is claimed is:

1. A prismatic battery case manufacturing method comprising:
    a first process step for forming a first intermediate cup element having a substantially elliptic cross section by subjecting a battery case material punched into a predetermined shape to deep drawing;
    a second process step for forming a second intermediate cup element having a substantially elliptic cross section which is smaller in minor-axis-diameter to major-axis-diameter ratio than the cross section of the first intermediate cup element by subjecting the first intermediate cup element to redrawing successively in a plural stages; and
    a third process step for forming a prismatic battery case having a substantially rectangular cross section in which a shorter-side plate is made larger in thickness than a longer-side plate by subjecting the second intermediate cup element to DI processing, wherein drawing and ironing are performed successively at a time.

2. The prismatic battery case manufacturing method according to claim 1, wherein, at least in a first redrawing at the second process step, with use of a drawing die having a substantially elliptic drawing hole whose major-axis-diameter is 5 to 20% longer than a major-axis-diameter of the first intermediate cup element, the first intermediate cup element is given a substantially elliptic cross section which is smaller in minor-axis-diameter to major-axis-diameter ratio than the cross section of the first intermediate cup element by performing drawing in such a way that only the dimension in a minor-axis-diameter direction is reduced without restricting the dimension in a major-axis-diameter direction.

3. The prismatic battery case manufacturing method according to any one of claims 1 and 2, wherein the battery case material is punched into a substantially oval shape at the first process step.

* * * * *